(12) United States Patent
Yuan et al.

(10) Patent No.: US 10,066,160 B2
(45) Date of Patent: Sep. 4, 2018

(54) SOLID-STATE WHITE LIGHT GENERATING LIGHTING ARRANGEMENTS INCLUDING PHOTOLUMINESCENCE WAVELENGTH CONVERSION COMPONENTS

(71) Applicant: Intematix Corporation, Fremont, CA (US)

(72) Inventors: Xianglong Yuan, Manteca, CA (US); Yi-Qun Li, Danville, CA (US)

(73) Assignee: Intematix Corporation, Fremont, CA (US)

( * ) Notice: Subject to any disclaimer, the term of this patent is extended or adjusted under 35 U.S.C. 154(b) by 0 days.

(21) Appl. No.: 15/143,384

(22) Filed: Apr. 29, 2016

(65) Prior Publication Data
US 2016/0320003 A1    Nov. 3, 2016

Related U.S. Application Data

(60) Provisional application No. 62/156,129, filed on May 1, 2015.

(51) Int. Cl.
| C09K 11/00 | (2006.01) |
| C09K 11/06 | (2006.01) |
| C09K 11/02 | (2006.01) |
| C09K 11/77 | (2006.01) |

(52) U.S. Cl.
CPC ............. *C09K 11/06* (2013.01); *C09K 11/02* (2013.01); *C09K 11/7734* (2013.01); *C09K 11/7774* (2013.01); *Y02B 20/181* (2013.01)

(58) Field of Classification Search
None
See application file for complete search history.

(56) References Cited

U.S. PATENT DOCUMENTS

| 6,463,186 | B1 | 10/2002 | Li |
| 6,641,940 | B1 | 11/2003 | Li |
| 6,911,129 | B1 | 6/2005 | Li |
| 7,267,787 | B2 | 9/2007 | Dong |
| 7,279,120 | B2 | 10/2007 | Cheng |
| 7,311,858 | B2 | 12/2007 | Wang |
| 7,351,444 | B2 | 4/2008 | Wang |
| 7,390,437 | B2 | 6/2008 | Dong |
| 7,575,697 | B2 | 8/2009 | Li |
| 7,597,817 | B1 | 10/2009 | Li |
| 7,601,276 | B2 | 10/2009 | Li |
| 7,655,156 | B2 | 2/2010 | Cheng |
| 7,703,943 | B2 | 4/2010 | Li |
| 7,736,536 | B2 | 6/2010 | Wang |
| 7,737,636 | B2 | 6/2010 | Li |

(Continued)

FOREIGN PATENT DOCUMENTS

| JP | 2015144261 A | 8/2015 |
| JP | 2017222868 A | 12/2017 |

(Continued)

*Primary Examiner* — Christle I Marshall
(74) *Attorney, Agent, or Firm* — Vista IP Law Group, LLP

(57) ABSTRACT

A white light photoluminescence wavelength conversion component comprises at least one blue light excitable green to yellow light (510 nm to 570 nm) emitting yttrium aluminum garnet (YAG) type phosphor material and at least one blue light excitable orange to red light (585 nm to 670 nm) emitting organic fluorescent dye.

22 Claims, 14 Drawing Sheets

(56) References Cited

U.S. PATENT DOCUMENTS

| | | |
|---|---|---|
| 7,830,434 B2 | 11/2010 | Li |
| 7,846,862 B2 | 12/2010 | Mei |
| 7,883,226 B2 | 2/2011 | Li |
| 7,972,030 B2 | 7/2011 | Li |
| D650,118 S | 12/2011 | Yang |
| D650,119 S | 12/2011 | Yang |
| D650,120 S | 12/2011 | Yang |
| 8,133,461 B2 | 3/2012 | Tao et al. |
| 8,143,769 B2 | 3/2012 | Li |
| 8,203,260 B2 | 6/2012 | Li |
| 8,211,825 B2 | 7/2012 | Mei |
| 8,274,215 B2 | 9/2012 | Liu |
| 8,337,029 B2 | 12/2012 | Li |
| 8,354,784 B2 * | 1/2013 | Yuan ............... H05B 33/14 313/483 |
| 8,414,796 B2 | 4/2013 | Tao et al. |
| 8,475,683 B2 | 7/2013 | Li |
| D688,820 S | 8/2013 | Yang |
| 8,529,791 B2 | 9/2013 | Wu et al. |
| 8,597,545 B1 | 12/2013 | Liu |
| 8,616,714 B2 | 12/2013 | Lee |
| 8,631,598 B2 | 1/2014 | Li |
| 8,663,502 B2 | 3/2014 | Tao |
| 8,679,367 B2 | 3/2014 | Liu |
| D710,535 S | 8/2014 | Edwards |
| 8,858,607 B1 * | 10/2014 | Jones ............... A61N 5/06 606/9 |
| D727,542 S | 4/2015 | Li |
| 9,028,718 B2 * | 5/2015 | Kijima ............... C09K 11/661 252/301.4 F |
| D747,031 S | 1/2016 | Edwards |
| 9,318,670 B2 | 4/2016 | Yuan |
| 9,512,970 B2 | 12/2016 | Edwards |
| 9,524,954 B2 * | 12/2016 | Li ............... F21V 9/16 |
| 2005/0064251 A1 | 3/2005 | Li |
| 2005/0112450 A1 | 5/2005 | Wang |
| 2005/0230726 A1 | 10/2005 | Li |
| 2006/0022170 A1 | 2/2006 | Li |
| 2006/0027785 A1 | 2/2006 | Wang |
| 2006/0158090 A1 | 7/2006 | Wang |
| 2006/0172179 A1 | 8/2006 | Gu |
| 2007/0065947 A1 | 3/2007 | Dong |
| 2007/0295383 A1 | 12/2007 | Li |
| 2008/0029720 A1 | 2/2008 | Li |
| 2008/0036364 A1 | 2/2008 | Li |
| 2008/0070801 A1 | 3/2008 | Xiang |
| 2008/0074583 A1 | 3/2008 | Li |
| 2008/0111472 A1 | 5/2008 | Liu |
| 2008/0113877 A1 | 5/2008 | Li |
| 2008/0116786 A1 | 5/2008 | Wang |
| 2008/0138268 A1 | 6/2008 | Tao |
| 2008/0151143 A1 | 6/2008 | Li |
| 2008/0192458 A1 | 8/2008 | Li |
| 2008/0197290 A1 | 8/2008 | Yuan |
| 2009/0021148 A1 * | 1/2009 | Hachiya ............... C09K 11/06 313/504 |
| 2009/0069172 A1 | 3/2009 | Farag |
| 2009/0082198 A1 | 3/2009 | Mei |
| 2009/0101930 A1 | 4/2009 | Li |
| 2009/0134414 A1 | 5/2009 | Li |
| 2009/0224652 A1 | 9/2009 | Li |
| 2009/0283721 A1 | 11/2009 | Liu |
| 2009/0294780 A1 | 12/2009 | Chou |
| 2009/0306478 A1 * | 12/2009 | Mizuyoshi ............... A61B 1/0638 600/178 |
| 2010/0027293 A1 | 2/2010 | Li |
| 2010/0102250 A1 | 4/2010 | Li |
| 2010/0164346 A1 | 7/2010 | Li |
| 2010/0181529 A1 | 7/2010 | Huang |
| 2010/0181582 A1 | 7/2010 | Li |
| 2010/0314639 A1 * | 12/2010 | Taniguchi ............ C09K 11/0883 257/89 |
| 2011/0008678 A1 | 1/2011 | Li |
| 2011/0110095 A1 | 5/2011 | Li |
| 2011/0115406 A1 | 5/2011 | Wang |
| 2011/0149548 A1 | 6/2011 | Yang |
| 2012/0018768 A1 | 1/2012 | Li |
| 2012/0032600 A1 | 2/2012 | Edwards |
| 2012/0043503 A1 | 2/2012 | Li |
| 2012/0074833 A1 * | 3/2012 | Yuan ............... H05B 33/14 313/483 |
| 2012/0086034 A1 | 4/2012 | Yuan |
| 2012/0087103 A1 | 4/2012 | Dai |
| 2012/0087104 A1 | 4/2012 | Dai |
| 2012/0087105 A1 | 4/2012 | Dai |
| 2012/0138874 A1 | 6/2012 | Yuan |
| 2012/0140435 A1 | 6/2012 | Li |
| 2012/0140436 A1 | 6/2012 | Yang |
| 2012/0140466 A1 | 6/2012 | Yang |
| 2012/0147624 A1 | 6/2012 | Li |
| 2012/0153311 A1 | 6/2012 | Yuan |
| 2012/0155076 A1 | 6/2012 | Li |
| 2012/0201030 A1 | 8/2012 | Yuan |
| 2012/0229038 A1 | 9/2012 | Zeng |
| 2012/0262903 A1 * | 10/2012 | Li ............... F21V 9/16 362/84 |
| 2012/0267997 A1 * | 10/2012 | Kijima ............... C09K 11/661 313/498 |
| 2012/0287381 A1 | 11/2012 | Li |
| 2013/0092964 A1 | 4/2013 | Li |
| 2013/0127332 A1 | 5/2013 | Chen |
| 2013/0140491 A1 | 6/2013 | Li |
| 2013/0168605 A1 | 7/2013 | Li |
| 2013/0176723 A1 | 7/2013 | Yang |
| 2013/0176724 A1 | 7/2013 | Yang |
| 2013/0187556 A1 | 7/2013 | Zeng |
| 2013/0214676 A1 | 8/2013 | Li |
| 2013/0250211 A1 * | 9/2013 | Chao ............... F21V 11/00 349/62 |
| 2013/0293098 A1 | 11/2013 | Li |
| 2014/0055982 A1 | 2/2014 | Tao |
| 2014/0103373 A1 * | 4/2014 | Li ............... H01L 33/502 257/88 |
| 2014/0185269 A1 | 7/2014 | Li |
| 2014/0198480 A1 | 7/2014 | Dai |
| 2014/0218892 A1 | 8/2014 | Edwards |
| 2014/0306599 A1 | 10/2014 | Edwards |
| 2015/0061489 A1 | 3/2015 | Gu |
| 2015/0084083 A1 * | 3/2015 | Hirosaki ............... C09K 11/7734 257/98 |
| 2015/0145406 A1 | 5/2015 | Li |
| 2015/0308635 A1 * | 10/2015 | Li ............... H01L 33/502 362/84 |
| 2016/0064622 A1 * | 3/2016 | Yuan ............... C09K 11/02 427/157 |
| 2016/0320003 A1 | 11/2016 | Yuan |
| 2017/0023830 A1 | 1/2017 | Yang |
| 2017/0025582 A1 | 1/2017 | Dai |
| 2017/0145309 A1 | 5/2017 | Zhu |
| 2017/0145310 A1 | 5/2017 | Li |

FOREIGN PATENT DOCUMENTS

| | | |
|---|---|---|
| WO | WO-2012009455 A1 | 1/2012 |
| WO | WO-2012122401 A2 | 9/2012 |
| WO | WO-2013052749 A2 | 4/2013 |
| WO | WO-2013056009 A1 | 4/2013 |
| WO | WO-2014004923 A1 | 1/2014 |
| WO | WO-2014015038 A1 | 1/2014 |
| WO | WO-2014101073 A1 | 7/2014 |

* cited by examiner

SOLID-STATE WHITE LIGHT GENERATING LIGHTING ARRANGEMENTS INCLUDING PHOTOLUMINESCENCE WAVELENGTH CONVERSION COMPONENTS

CROSS-REFERENCE TO RELATED APPLICATIONS

This application claims the benefit of priority to U.S. Provisional Application No. 62/156,129, filed on May 1, 2015, entitled "SOLID-STATE WHITE LIGHT GENERATING LIGHTING ARRANGEMENTS INCLUDING PHOTOLUMINESCENCE WAVELENGTH CONVERSION COMPONENTS", which is hereby incorporated by reference in its entirety.

FIELD

This disclosure relates to solid-state white light generating lighting arrangements that include photoluminescence wavelength conversion components. In particular, although not exclusively, embodiments of the invention concern photoluminescence wavelength conversion components capable of generating white light with a CRI (Color Rendering Index) of 80 and higher.

BACKGROUND

Recently, white light emitting LEDs ("white LEDs") have become more popular and more commonly used to replace conventional fluorescent, compact fluorescent and incandescent light sources. White LEDs generally include one or more photoluminescence materials (typically inorganic phosphor materials), which absorb a portion of the radiation emitted by the LED and re-emit light of a different color (wavelength). The phosphor material may be provided as a layer on, or incorporated within a wavelength conversion component that is located remotely from the LED. Typically, the LED generates blue light and the phosphor(s) absorbs a percentage of the blue light and re-emits yellow, green, or a combination of green and yellow light. The portion of the blue light generated by the LED that is not absorbed by the phosphor material combined with the light emitted by the phosphor provides light which appears to the eye as being white in color.

To generate white light with a higher CRI (Ra), that is 80 or higher, it is known to additionally include red and/or orange light emitting phosphors in the wavelength conversion component. The inclusion of orange and red phosphors can also be beneficial where it is required to generate "warm white" light, that is light with a lower CCT (Correlated Color Temperature), for example warm white light with a CCT of 2700K to 3000K. Whilst such arrangements are capable of producing light with the required characteristics, the very high cost of orange and/or red phosphors makes such arrangements prohibitively expensive for many applications. A need exists therefore for an inexpensive solution for generating high CRI color light and/or light with lower CCTs.

The present invention arose in an endeavor to at least in part overcome the drawbacks of the conventional photoluminescence wavelength conversion components.

SUMMARY OF THE INVENTION

Embodiments of the invention concern blue light excitable white light generating photoluminescence wavelength conversion components.

According to some embodiments, a white light photoluminescence wavelength conversion component comprises at least one blue light excitable green to yellow light emitting yttrium aluminum garnet type (YAG-type) phosphor material and at least one blue light excitable orange to red light emitting organic fluorescent dye. Within this patent specification YAG-type phosphor material refers to a garnet structured phosphor material containing at least yttrium (Y), aluminum (Al) and oxygen (O) and having a general composition $Y_3Al_5O_{12}$. Accordingly a YAG-type phosphor includes cerium (Ce) activated $Y_3Al_5O_{12}:Ce^{3+}$ phosphors generally denoted YAG:Ce. A YAG-type phosphor also encompasses phosphors of general composition $(Y, M)_3(Al, M')_5(O, M'')_{12}:Ce^{3+}$ in which there is partial substitution of one or more of the Y, Al or O by elements M, M' and M" respectively. M can include one or more of terbium (Tb), gadolinium (Gd), samarium (Sm), lutetium (Lu), lanthanum (La), strontium (Sr), barium (Ba), calcium (Ca) and/or magnesium (Mg); M' can include one or more of silicon (Si), germanium (Ge), boron (B), phosphorus (P) and/or gallium (Ga) and M" can include a halogen such as fluorine (F) or chlorine (Cl), nitrogen (N) and/or sulfur (S). Examples of YAG-type phosphors include, but are not limited to, yellow light emitting YAG-type phosphors $(Y, Lu)_3Al_5O_{12}:Ce^{3+}$ and $(Y, Gd)_3Al_5O_{12}:Ce^{3+}$ and green light emitting YAG-type phosphor $Y_3(Al, Ga, Ba)_5(O, F)_{12}:Ce^{3+}$. Examples of suitable organic fluorescent dyes include perylene based dyes and laser dyes such as rhodamine based dyes.

A particular benefit of the invention resides in combining an inexpensive YAG-type phosphor with a very small quantity of organic fluorescent dye (c.f. significantly larger quantities of inorganic orange to red phosphor material required to generate the same color of emitted light) to increase the CRI by increasing the orange to red portion of the components emission characteristic. Whilst the cost/weight of organic fluorescent dye can be comparable with, or even more expensive, than inorganic orange to red phosphors, the inventors have discovered that photoluminescence wavelength conversion components in accordance with the invention require three orders of magnitude less organic fluorescent dye than conventional red or orange phosphors. For example, wavelength conversion components in accordance with the invention can require less than 0.01% by weight organic dye out of the total photoluminescence material. In contrast, conventional wavelength conversion components typically require more than 10% by weight red phosphor out of the total photoluminescence material. As a result wavelength conversion components in accordance with the invention can be 30%, or more, less expensive than known photoluminescence wavelength conversion components based solely on inorganic phosphor materials. A further benefit of the invention is an increase in the CRI, R9 (deep red) test sample in the light emission product. Embodiments of the invention enable the generation of white light with a CRI of 80 or higher at a cost that is viable for virtually all remote phosphor applications. The present invention finds particular applications where the irradiance (incident radiant flux per unit area) of excitation light on the component is less than 150 mW·cm$^{-2}$.

The YAG-type phosphor, when excited by blue excitation light, can emit green to yellow light having a peak wavelength in a range 510 nm to 570 nm. In some embodiments where the YAG-type phosphor comprises a green light emitting material which when excited by blue excitation light emits light having a peak wavelength in a range 525 nm to 542 nm. Alternatively and/or in addition the YAG-type phosphor can comprise a yellow light emitting material which when excited by blue excitation light, emits light having a peak wavelength in a range 545 nm to 570 nm. Typically, the one or more YAG-type phosphor(s) is/are excitable by blue light having a peak wavelength in a range 430 nm to 490 nm.

The at least one orange to red light emitting organic fluorescent dye, when excited by blue excitation light, emits orange to red light having a peak wavelength in a range 585 nm to 670 nm. In some embodiments the organic fluorescent dye comprises an orange light emitting material which when excited emits light having a peak wavelength in a range 585 nm to 610 nm. Alternatively and/or in addition the organic fluorescent dye is a red light emitting material which when excited emits light having a peak wavelength in a range 615 nm to 670 nm. Use of a red light emitting organic dye is particularly advantageous in applications requiring a higher CRI, R9 (deep red) test sample in the emission product.

The white light photoluminescence wavelength conversion component can be light transmissive or light reflective.

For a light transmissive wavelength conversion component, the component further comprises a light transmissive substrate. In one embodiment, the YAG-type phosphor and organic fluorescent dye are incorporated in, and distributed throughout, the light transmissive substrate. In such embodiments the light transmissive substrate preferably comprises a polycarbonate though in other embodiments it may comprise an acrylic or a silicone. The wavelength conversion component can be substantially planar in form or have a 3D form, that is it has a form that defines an internal volume such as for example a hemispherical shell. The wavelength conversion component is preferably manufactured by extrusion or by injection molding.

In other light transmissive wavelength conversion components, the YAG-type phosphor and organic fluorescent dye comprise at least one layer on a surface of the light transmissive substrate. Typically, the YAG-type phosphor and organic fluorescent dye are incorporated in a light transmissive binder and the mixture then deposited as one or more layers on the surface of the light transmissive substrate. The YAG-type phosphor and organic fluorescent dye can be incorporated together in a single layer or comprise respective separate layers. Typically, the light transmissive binder comprises a curable liquid polymer such as a polymer resin, a monomer resin, an acrylic, an epoxy, a silicone or a fluorinated polymer. The one or more layers containing the YAG-type phosphor and organic fluorescent dye can be deposited as a substantially uniform thickness layer on the substrate by screen printing, slot die coating, spin coating, roller coating, drawdown coating, doctor blading, extrusion or injection molding. The light transmissive substrate preferably comprises a polycarbonate, acrylic, a glass or a silicone.

For a light reflective wavelength conversion component the component comprises a light reflective substrate with the YAG-type phosphor and organic fluorescent dye comprising at least one layer on a light reflective surface of the substrate. Typically, the green to yellow YAG-type phosphor and red to orange light emitting organic fluorescent dye are incorporated in a light transmissive binder and the mixture then deposited as one or more layers on the surface of the light reflective substrate. The YAG-type phosphor and organic fluorescent dye can be incorporated together in a single layer or comprise respective separate layers. Typically, the light transmissive binder comprises a curable liquid polymer such as a polymer resin, a monomer resin, an acrylic, an epoxy, a silicone or a fluorinated polymer. The one or more layers containing the YAG-type phosphor and organic fluorescent dye can be deposited as a substantially uniform thickness layer on the light reflective substrate by screen printing, slot die coating, spin coating, roller coating, drawdown coating, doctor blading, extrusion or injection molding. The light reflective substrate can comprise any material having a high reflectivity surface such as a highly reflective paper, plastics material or metallic material.

To reduce the quantity of YAG-type phosphor required to generate a selected color of light and/or to improve the emission color uniformity, especially to improve color over angle, the wavelength conversion component can further comprise particles of a light scattering material. Typically, the light scattering material is incorporated as a mixture with the YAG-type phosphor. Examples of suitable scattering materials include magnesium oxide, titanium dioxide, barium sulfate or combinations thereof. In some embodiments the light scattering material has a particle size in a range 0.01 μm to 10 μm; 0.01 μm to 1 μm or 0.1 μm to 1 μm. To reduce the impact of the light scattering material on phosphor generated light, the light scattering material comprises particles of a size such that the particles scatter blue light relatively more than light generated by the YAG type phosphor through a process of Mie scattering. Typically, the light scattering material has a particle size in a range 100 nm to 150 nm.

In preferred embodiments the white light photoluminescence wavelength conversion component, when excited by blue light, generates white light having a CRI of at least 80 and more preferably at least 90.

According to a further aspect of one embodiment of the invention a white light photoluminescence wavelength conversion component comprises: a polycarbonate light transmissive substrate; at least one blue light excitable green to yellow YAG-type phosphor material, which when excited, emits green to yellow light having a peak wavelength in a range 510 nm to 570 nm; and at least one blue light excitable orange to red light emitting organic fluorescent dye, which when excited, emits orange to red light having a peak wavelength in a range 585 nm to 670 nm; wherein the green to yellow YAG-type phosphor material and the orange to red light emitting organic fluorescent dye are incorporated in, and distributed throughout, the light transmissive polycarbonate substrate.

According to another aspect of an embodiment of the invention a white light emitting device comprises a solid-state light emitter operable to generate blue light having a peak wavelength in a range 430 nm to 490 nm and a white light photoluminescence wavelength conversion component according to various embodiments of the invention.

DESCRIPTION OF THE DRAWINGS

In order that the present invention is better understood an LED-based lighting arrangement and white light photoluminescence wavelength conversion components in accordance with the invention will now be described, by way of example only, with reference to the accompanying drawings in which like reference numerals are used to denote like parts, and in which.

DETAILED DESCRIPTION OF THE INVENTION

Embodiments of the present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Light Transmissive Photoluminescence Wavelength Conversion Components

Figure 1:
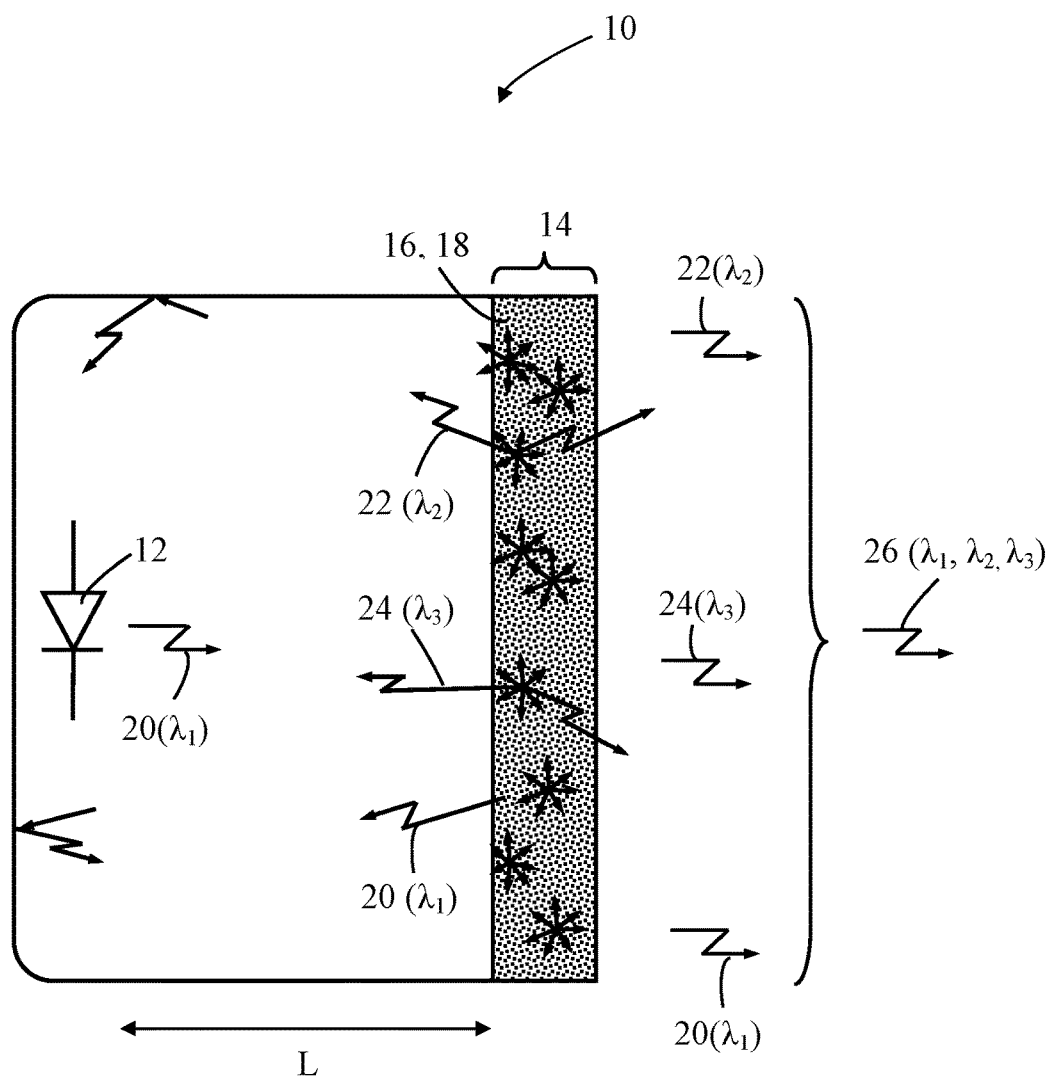
FIG. 1 is schematic representation of an LED-based lighting arrangement in accordance with an embodiment of the invention.

FIG. 1 illustrates a schematic representation of an LED-based lighting arrangement 10 in accordance with an embodiment of the invention. The lighting arrangement 10 comprises one or more blue light emitting LEDs 12 and a light transmissive white light photoluminescence wavelength conversion component (wavelength conversion component) 14 located remotely to the LED(s) 12. The wavelength conversion component 14 includes at least one blue light excitable green light to yellow light emitting YAG-type (Yttrium Aluminum Garnet) phosphor 16 and at least one blue light excitable orange light to red light emitting organic fluorescent dye 18. To reduce the transfer of heat from the LED(s) 12 to the wavelength conversion component 14, in particular heat transfer to the photoluminescence materials (YAG-type phosphor and organic fluorescent dye), the wavelength conversion component 14 is located remotely to the LEDs, physically separated, by a distance L which is typically a few millimeters. In the context of this specification "remote" and "remotely" is used to indicate physically separated by for an air gap typically or light transmissive medium. The blue LED(s) 12 typically comprise GaN-based (gallium nitride-based) LEDs that are operable to generate blue excitation light 20 having an emission peak wavelength $\lambda_1$ in a wavelength range 430 nm to 490 nm (typically 450 nm to 460 nm). The blue LED(s) 12 are configured to irradiate the wavelength conversion component 14 with blue excitation light 20 whereat a proportion is absorbed by the YAG-type phosphor material 16 and organic fluorescent dye 18 which in response respectively emit yellow to green light 22 with an emission peak wavelength $\lambda_2$ in a wavelength range 510 nm to 570 nm and orange to red light 24 with an emission peak wavelength $\lambda_3$ in a wavelength range 585 nm to 670 nm. The emission product 26 of the device 10, which is configured to appear white in color with a selected CCT and CRI (Ra), comprises a combination of blue light 20 ($\lambda_1$) emitted by the LED(s), green to yellow photoluminescence light 22 ($\lambda_2$) generated by the one or more YAG-type phosphor materials and orange to red photoluminescence light 24 ($\lambda_3$) generated by the organic fluorescent dye.

Locating the photoluminescence materials remote to the LED(s) provides a number of benefits compared with known devices in which the phosphor material is provided in direct contact with the light emitting surface of the LED chip in the form of an encapsulant, including reduced thermal degradation of the photoluminescence materials. Additionally, providing the phosphor remotely to the LED(s) over an area many times greater that the light emitting area of the LED chip(s) reduces re-absorption by the LED chip(s) of back-scattered excitation light and absorption by the LED chip(s) of photoluminescence light. Furthermore, locating the phosphor remotely enables generation of light of a more consistent color and/or CCT since the phosphor material is provided over a much greater area as compared with providing the phosphor directly on the light emitting surface of the LED.

Figure 2:
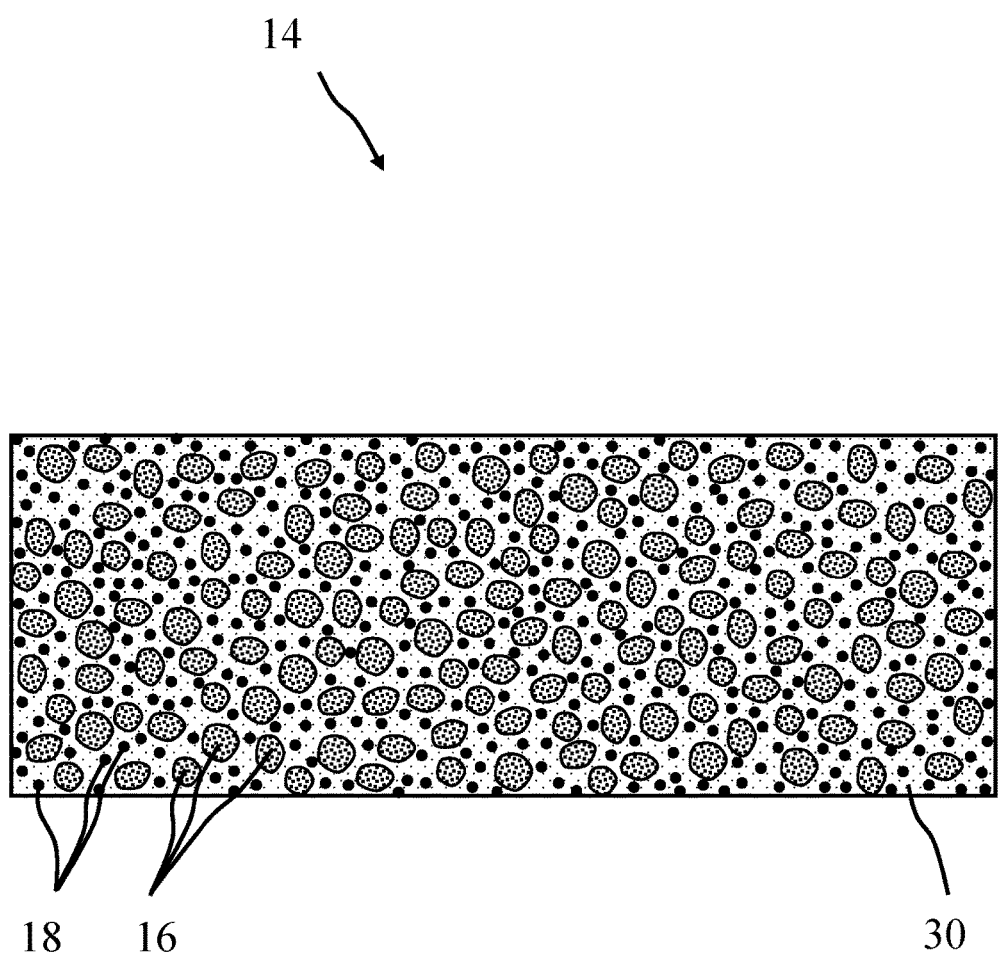
FIG. 2 is a schematic representation of a light transmissive white light photoluminescence wavelength conversion component in accordance with an embodiment of the invention.

FIG. 2 illustrates a light transmissive white light photoluminescence wavelength conversion component 14 in accordance with an embodiment of the invention for use in the lighting arrangement 10 of FIG. 1. As indicated in FIG. 2, The wavelength conversion component 14 comprises a light transmissive substrate 30 composed of a light transmissive material, preferably polycarbonate (PC), though in other embodiments it may comprise a poly(methyl methacrylate) (PMMA), polyethylene terephthalate (PET), an acrylic, a silicone or thermoform plastics. The YAG-type phosphor 16 and the organic fluorescent dye 18 are incorporated in, and substantially homogeneously distributed throughout, the light transmissive polycarbonate substrate 30. The wavelength conversion component can, as shown, be substantially planar in form or have a 3D form, that is it has a form that defines an internal volume such as for example a hemispherical shell or cylindrical form. The wavelength conversion component is preferably manufactured by extrusion or by injection molding. The YAG-type phosphor 16 and organic fluorescent dye 18 which are both in powder form, are thoroughly mixed in known proportions with a polycarbonate powder and the mixture then pelletized ready for use for extrusion or injection molding. Alternatively, the powders can be mixed in the extrusion/injection molding equipment.

In some embodiments the YAG-type phosphor comprises a green light emitting material which, when excited by blue excitation light, emits light having an emission peak wavelength in a range 525 nm to 542 nm. Alternatively and/or in addition the YAG-type phosphor can comprise a yellow light emitting material which when excited by blue excitation light, emits light having a peak wavelength in a range 545 nm to 570 nm. Typically, the one or more YAG-type phosphor(s) is/are excitable by blue light having a peak wavelength in a range 430 nm to 490 nm. The YAG-type phosphor material comprises particles that are generally spherical in form having an average particle size (D50) of between about 5 µm and about 35 µm. Typically, the YAG-type phosphor comprises particles of diameter of 10 µm to 20 µm and preferably of order 15 µm.

Within this patent specification YAG-type phosphor material refers to a garnet structured phosphor material containing at least yttrium (Y), aluminum (Al) and oxygen (O) and of general composition $Y_3Al_5O_{12}$. Accordingly a YAG-type phosphor includes a cerium (Ce) activated $Y_3Al_5O_{12}:Ce^{3+}$ phosphor generally denoted YAG:Ce. A YAG-type phosphor also encompasses phosphors of general composition $(Y, M)_3(Al, M')_5(O, M'')_{12}:Ce^{3+}$ in which there is partial substitution of one or more of the Y, Al or O by elements M, M' and M" respectively. M can include one or more of terbium (Tb), gadolinium (Gd), samarium (Sm), lutetium (Lu), lanthanum (La), strontium (Sr), barium (Ba), calcium (Ca) and/or magnesium (Mg); M' can include one or more of silicon (Si), germanium (Ge), boron (B), phosphorus (P) and/or gallium (Ga) and M" can include a halogen such as fluorine (F) or chlorine (Cl), nitrogen (N) and/or sulfur (S). Examples of such phosphors are disclosed in U.S. Pat. No. 8,133,461 B2 and U.S. Pat. No. 8,414,796 B2, both entitled "Nano-YAG:Ce Phosphor Compositions and Their Methods of Preparation" and U.S. Pat. No. 8,529,791 B2, entitled "Green-Emitting, Garnet-Based Phosphors in General and Backlighting Applications", each of which is hereby incorporated by reference in its entirety. The YAG-type phosphor can include any of the NYAG family of phosphors from Intematix Corporation of Fremont, Calif., USA.

Depending on the CRI (Color Rendering Index) of light to be generated by the wavelength conversion component, the orange to red light emitting organic fluorescent dye, when excited by excitation light, emits orange to red light having a peak wavelength in a range 585 nm to 670 nm. In some embodiments the organic fluorescent dye comprises an orange light emitting material which when excited emits light having a peak wavelength in a range 585 nm to 610 nm. Alternatively and/or in addition the organic fluorescent dye is a red light emitting material which when excited emits light having a peak wavelength in a range 615 nm to 670 nm. Examples of suitable organic fluorescent dyes include, but are not limited to, perylene based dyes such as BASF's Lumogen® F range of perylene based dyes, such as Lumogen® F Red 305 dye which has an emission peak wavelength between 610 nm and 620 nm and Lumogen® F Orange 240 dye, which has an emission peak wavelength between 570 nm to 580 nm. Further examples of suitable organic fluorescent dyes include laser dyes such as rhodamine based dyes.

EXAMPLE 1

4000K, 80CRI Light Transmissive Wavelength Conversion Component

The composition of a 4000K, 80CRI light transmissive white light photoluminescence wavelength conversion component ("Example 1") in accordance with an embodiment of the invention is given in Table 1. The Example 1 component is composed of a mixture of yellow (551 nm) YAG phosphor, green (543 nm) YAG phosphor and Lumogen® F Red 305 organic dye incorporated in, and distributed throughout, a polycarbonate substrate (FIG. 2). The component is typically of a thickness of about 1.5 mm. The yellow (551 nm) YAG phosphor comprises a YAG:$Ce^{3+}$ phosphor of general composition $Y_3(Al, Ba)_5(O, F)_{12}:Ce^{3+}$ and the green (543 nm) YAG phosphor comprises a YAG:$Ce^{3+}$ phosphor of general composition $Y_3(Al, Lu, Ba)_5(O, F)_{12}:Ce^{3+}$. As can be seen from Table 1, the yellow (551 nm) and green (543 nm) YAG phosphors each constitute 49.997% by weight of the total photoluminescence materials whilst the organic fluorescent dye constitutes only 0.005% of the total weight of luminescent materials.

TABLE 1

Example 1: 4000K, 80CRI light transmissive photoluminescence wavelength conversion component composition

| Constituent | Weight (grams) | Total weight % | Photoluminescence material Weight % |
|---|---|---|---|
| Polycarbonate | 469.50 | 93.90% | — |
| Yellow (551 nm) YAG phosphor | 15.25 | 3.05% | 49.997% |
| Green (543 nm) YAG phosphor | 15.25 | 3.05% | 49.997% |
| Lumogen R 305 dye | 0.00164 | 0.000003% | 0.005% |
| Total | 500 | 100% | 100% |

For comparison purposes, the composition of a known 4000K, 80CRI light transmissive photoluminescence wavelength conversion component ("Reference") using all inorganic phosphors is given in Table 2. The Reference component is composed of a mixture of yellow (556 nm) YAG phosphor, green (540 nm) YAG phosphor and red (626 nm) nitride phosphor. The yellow (556 nm) YAG phosphor comprises a YAG:$Ce^{3+}$ phosphor of general composition $Y_3(Al, Ba)_5(O, F)_{12}:Ce^{3+}$, the green (540 nm) YAG phosphor comprises a YAG:$Ce^{3+}$ phosphor of general composition $Y_3(Al, Ga, Ba)_5(O, F)_{12}:Ce^{3+}$ and the red (626 nm) nitride phosphor a phosphor of general composition (Ca, Sr)AlSiN$_3$:Eu. As can be seen from Table 2 the yellow (556 nm) and green (540 nm) YAG phosphors constitute about 22% and 64% respectively by weight of the total photoluminescence materials whilst the red phosphor constitutes about 14% of the total weight of luminescent materials.

TABLE 2

Reference: 4000K, 80CRI light transmissive photoluminescence wavelength conversion component composition

| Constituent | Weight (grams) | Total weight % | Photoluminescence material Weight % |
|---|---|---|---|
| Polycarbonate | 481.50 | 96.3% | — |
| Yellow (556 nm) YAG phosphor | 4.00 | 0.80% | 21.5% |
| Green (540 nm) YAG phosphor | 2.59 | 0.52% | 64.44% |
| Red (626 nm) nitride phosphor | 11.92 | 2.38% | 14.02% |
| Total | 500 | 100% | 100% |

Figure 3:
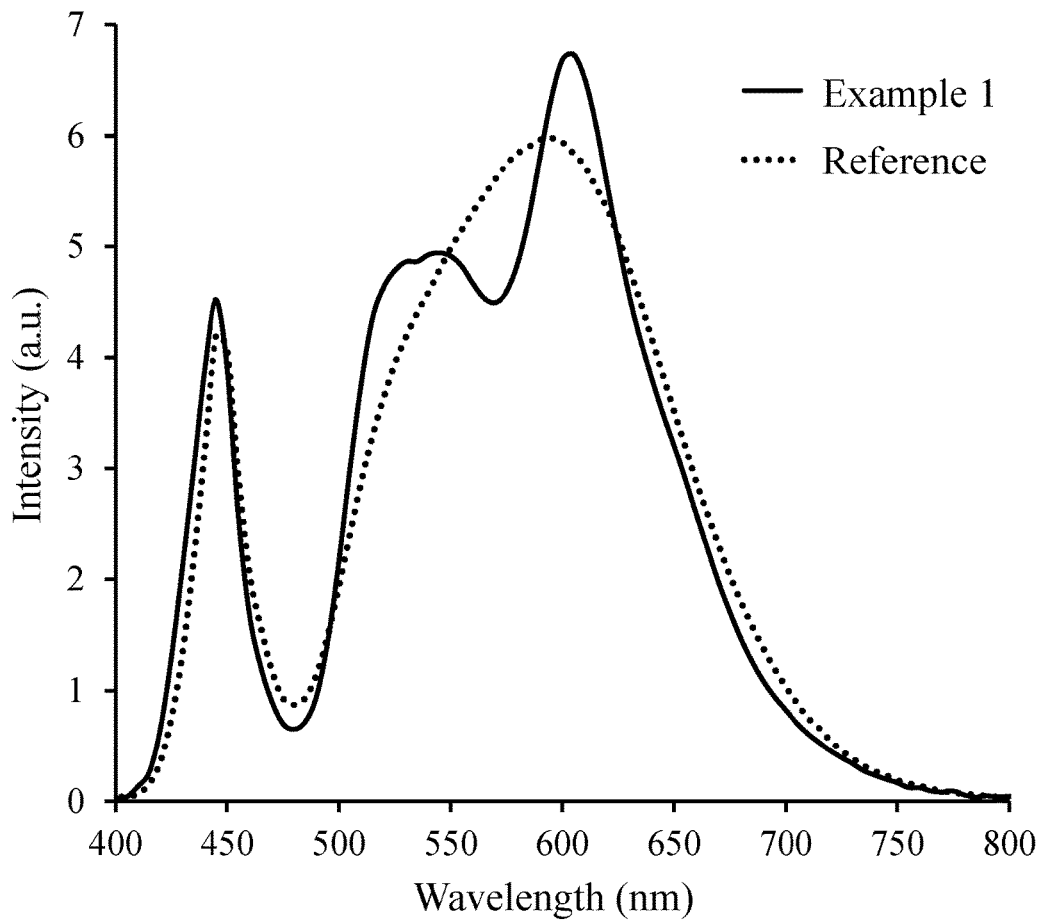
FIG. 3 shows the emission spectrum for a 4000K, 80CRI light transmissive white light photoluminescence wavelength conversion component (Example 1) in accordance with an embodiment with the invention.

FIG. 3 shows measured emission spectrum (intensity versus wavelength) for i) the Example 1 wavelength conversion component (solid line) and ii) the Reference wavelength conversion component (dash line). Table 3 gives various characteristics of the wavelength conversion components Example 1 and Reference. As will be noted from FIG. 3 and Table 3, the photoluminescence wavelength conversion component (Example 1) in accordance with the invention performs better than the equivalent known wavelength conversion component (Reference) based solely on inorganic phosphors. As described above, the red phosphor constitutes about 14% of the total weight of photoluminescence materials of the Reference component. In terms of overall component cost, the cost of the red phosphor represents 30% of the total component cost per unit weight ($·kg$^{-1}$). In contrast for photoluminescence wavelength conversion components in accordance with the invention (e.g., Example 1), the cost of the organic fluorescent dye represents less than 0.01% of the total component cost per unit weight ($·kg$^{-1}$) (based on the weight cost ($·kg$^{-1}$) of organic fluorescent dyes being five times that of red phosphor). It will be appreciated that for high CRI photoluminescence wavelength conversion components in accordance with the invention these virtually eliminate the cost associated with the orange to red photoluminescence material(s). As a result, wavelength conversion components in accordance with the invention can be less expensive by 30% or more compared with known photoluminescence wavelength conversion components based solely on inorganic phosphor materials. Such a cost saving represents a significant technical advantage over the known solutions.

to CIE y at time t=0) versus time. All measured reliability data are for an excitation light irradiance of 110 mW·cm$^{-2}$.

EXAMPLE 2

3000K, 90CRI Light Transmissive Wavelength Conversion Component

The composition of a 3000K, 90CRI light transmissive photoluminescence wavelength conversion component (Example 2) in accordance with the invention is given in Table 4. The Example 2 conversion component is composed of a mixture of yellow (558 nm) YAG phosphor, green (531 nm) YAG phosphor and Lumogen® F Red 305 organic dye incorporated in, and distributed throughout, a polycarbonate substrate. The component is typically of a thickness of about 1.5 mm. The yellow (558 nm) YAG phosphor comprises a YAG:Ce$^{3+}$ phosphor of general composition Y$_3$(Al, Ba)$_5$(O, F)$_{12}$:Ce$^{3+}$. The green (531 nm) YAG phosphor comprises a YAG:Ce$^{3+}$ phosphor of general composition Y$_3$(Al, Ga, Ba)$_5$(O, F)$_{12}$. As can be seen from Table 4 the yellow (558 nm) and green (531 nm) YAG phosphors each constitute 49.99994% by weight of the total photoluminescence materials whilst the organic fluorescent dye constitutes only 0.00002% of the total weight of luminescent materials.

TABLE 4

Example 2: 3000K, 90CRI light transmissive photoluminescence wavelength conversion component composition

| Constituent | Weight (grams) | Total Weight % | Photoluminescence material Weight % |
|---|---|---|---|
| Polycarbonate | 459.5 | 91.9% | — |
| Yellow (558 nm) YAG phosphor | 20.25 | 4.05% | 49.99994% |
| Green (531 nm) YAG phosphor | 20.25 | 4.05% | 49.99994% |
| Lumogen R 305 dye | 0.00458 | 0.000009% | 0.00002% |
| Total | 500 | 100% | 100% |

Figure 5:
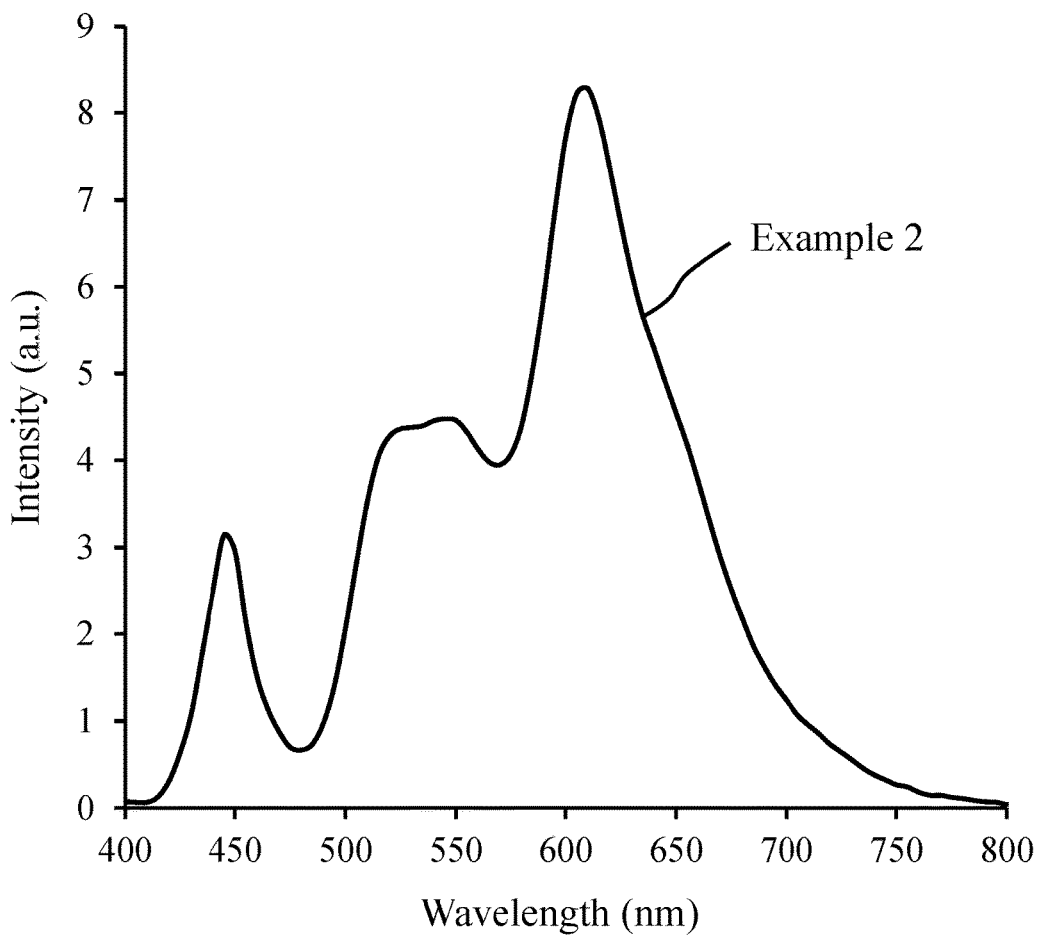
FIG. 5 shows the emission spectrum for a 3000K, 90CRI light transmissive white light photoluminescence wavelength conversion component (Example 2) in accordance with the invention.

FIG. 5 shows the measured emission spectrum (intensity versus wavelength) for wavelength conversion component Example 2. Table 3 above, also gives various characteristics of the wavelength conversion component Example 2. By

TABLE 3

Light transmissive wavelength conversion components measured performance

| Component | CCT (K) | CIE x | CIE y | CRI R$_a$ | R9 | Conversion Efficacy (Lm/bW) | Luminous Efficacy (Lm/wW) | Quantum Efficiency (%) | Stokes Efficiency (%) |
|---|---|---|---|---|---|---|---|---|---|
| Example 1 | 4019 | 0.3818 | 0.3859 | 81.8 | 5.3 | 232.9 | 336.5 | 86.61 | 79.88 |
| Reference | 4019 | 0.3818 | 0.3747 | 79.6 | 10.9 | 217.7 | 326.3 | 83.69 | 79.38 |
| Example 2 | 3031 | 0.4338 | 0.3976 | 92.6 | 39.7 | 207.2 | 315.9 | 84.64 | 77.18 |

Figure 4A:
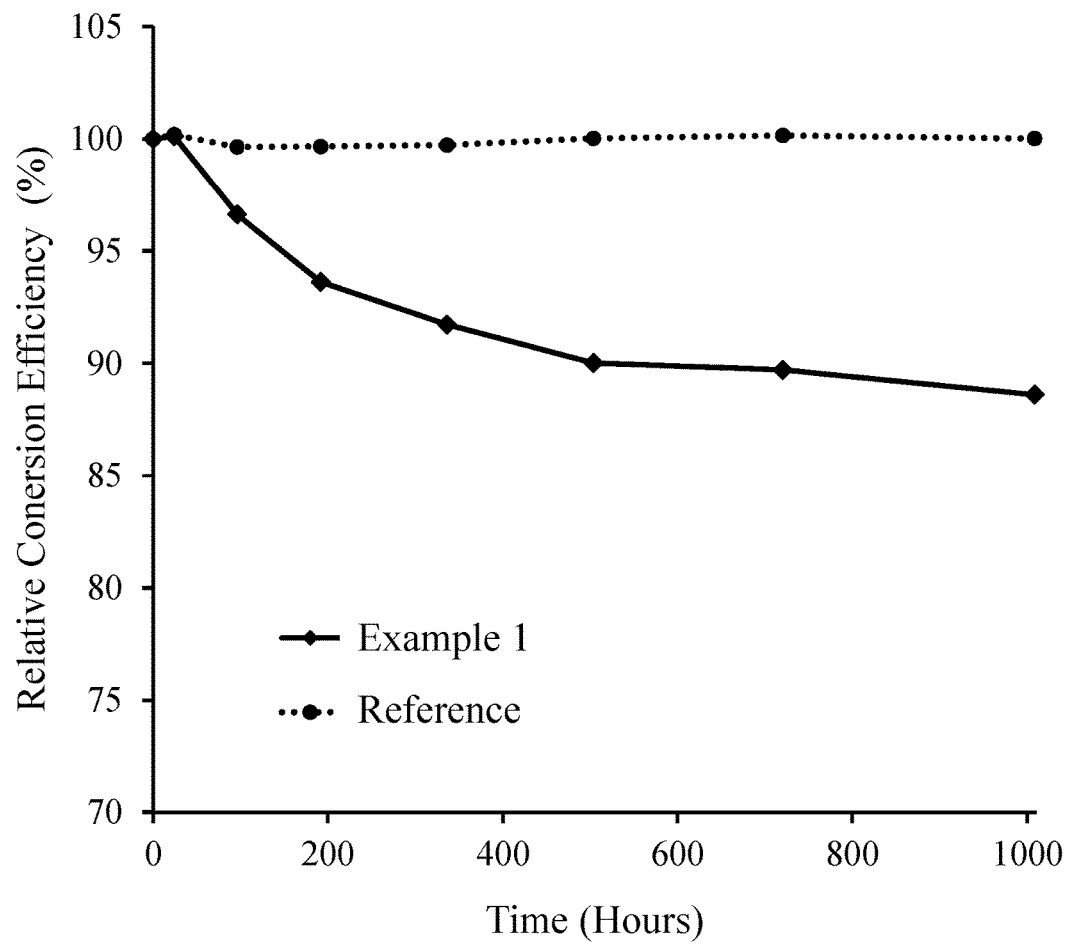
FIG. 4A to 4C are reliability data for a 4000K, 80CRI light transmissive white light photoluminescence wavelength conversion component (Example 1) in accordance with the invention respectively showing reliability data for: 4A conversion efficacy, 4B relative change of chromaticity Δ(CIE x) and 4C relative change of chromaticity Δ(CIE y)
Figure 4B:
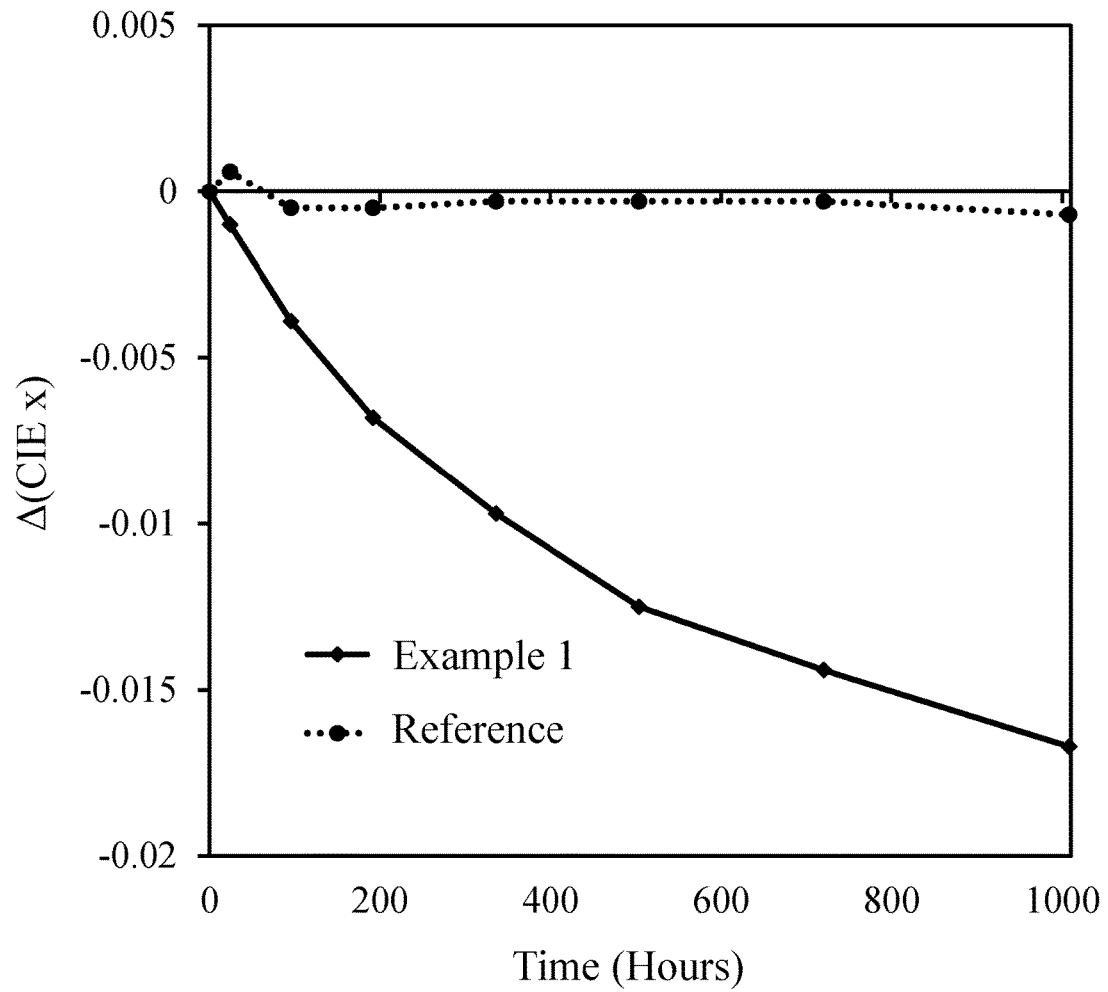
Figure 4C:
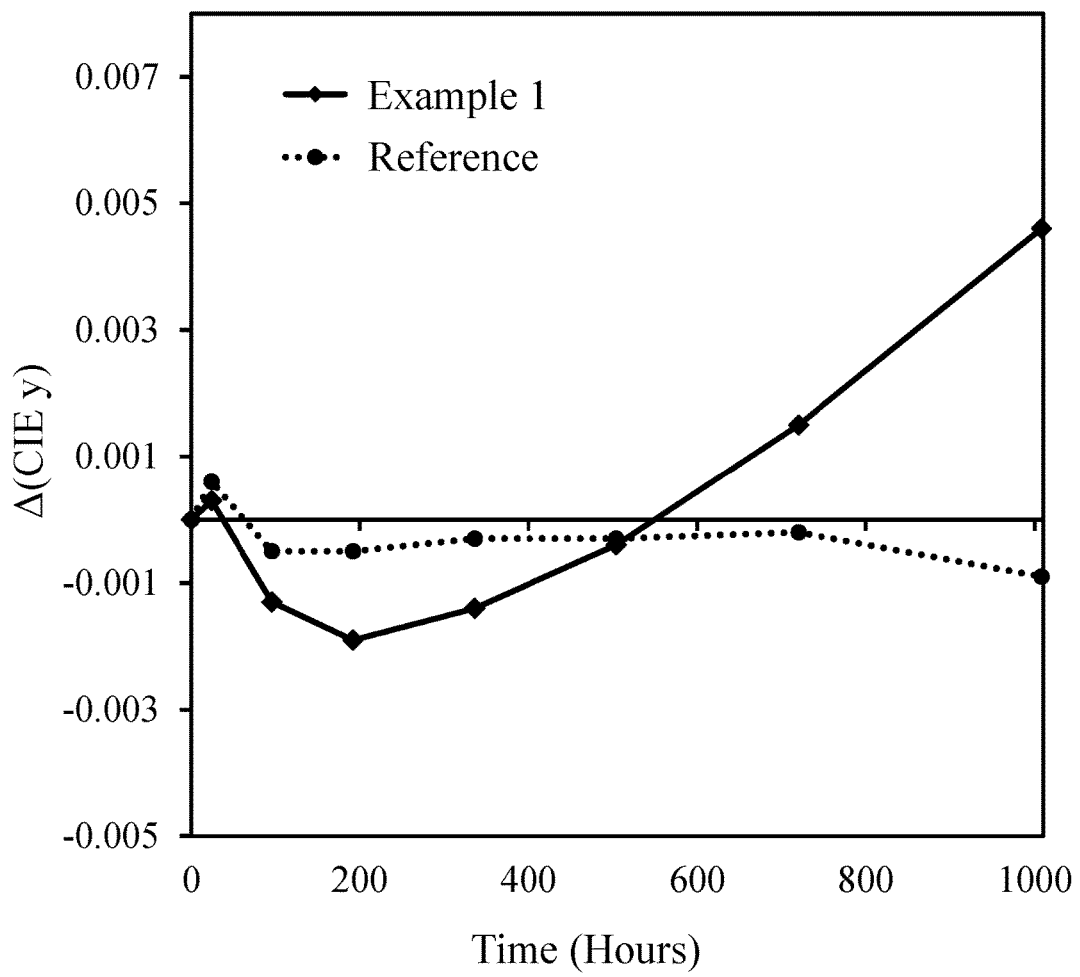

FIG. 4A to 4C are reliability data for wavelength conversion component Example 1 under accelerated testing conditions 85° C./85% RH (solid line) and under room temperature conditions (dashed line). The figures respectively show: 4A relative conversion efficacy (conversion efficacy relative to conversion efficacy at time t=0) versus time, 4B relative change of chromaticity Δ(CIE x) (change in CIE x relative to CIE x at time t=0) versus time and 4C relative change of chromaticity Δ(CIE y) (change in CIE y relative comparison with a known wavelength conversion component based solely on phosphors having the same nominal emission characteristics, the inventors have determined that photoluminescence wavelength conversion component in accordance with the invention (Example 2) perform as well as the known wavelength conversion components. The red phosphor in such known wavelength conversion components having an equivalent performance, typically constitute about 30% of the total component cost ($·kg$^{-1}$). In contrast for photoluminescence wavelength conversion components in accordance with the invention (Example 2) the organic fluorescent dye represents less than 0.000003% of the total component cost per unit weight ($·kg$^{-1}$) (based on the weight cost ($·kg$^{-1}$) of organic fluorescent dyes is five times that of red phosphor). It will be appreciated that for high CRI photoluminescence wavelength conversion components in accordance with the invention, such components virtually eliminate the costs associated with the orange to red photoluminescence material(s). As a result, wavelength conversion components in accordance with the invention can be less expensive by 30% or more compared with known photoluminescence wavelength conversion components based solely on inorganic phosphor materials.

Figure 6A:
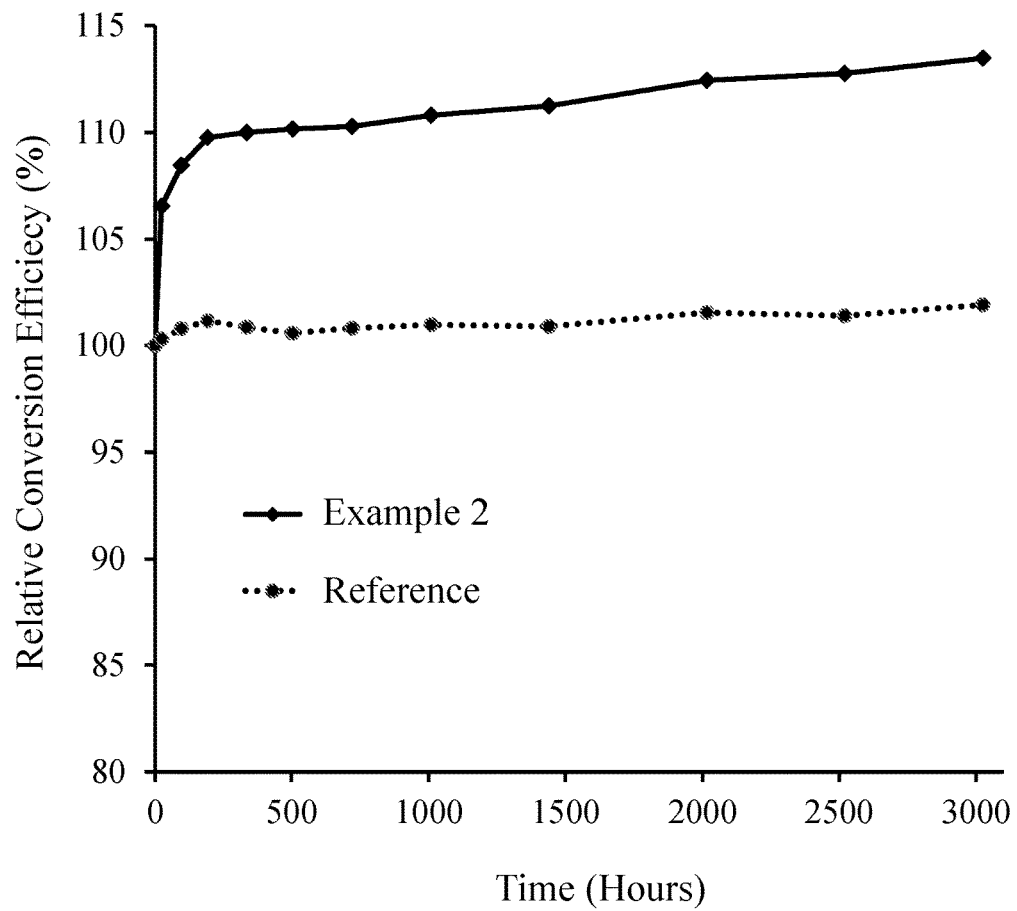
FIG. 6A to 6C are reliability data for a 3000K, 90CRI light transmissive white light photoluminescence wavelength conversion component (Example 2) in accordance with the invention respectively showing reliability data for: 6A relative conversion efficacy, 6B relative change of chromaticity Δ(CIE x) and 6C relative change of chromaticity Δ(CIE y)
Figure 6B:
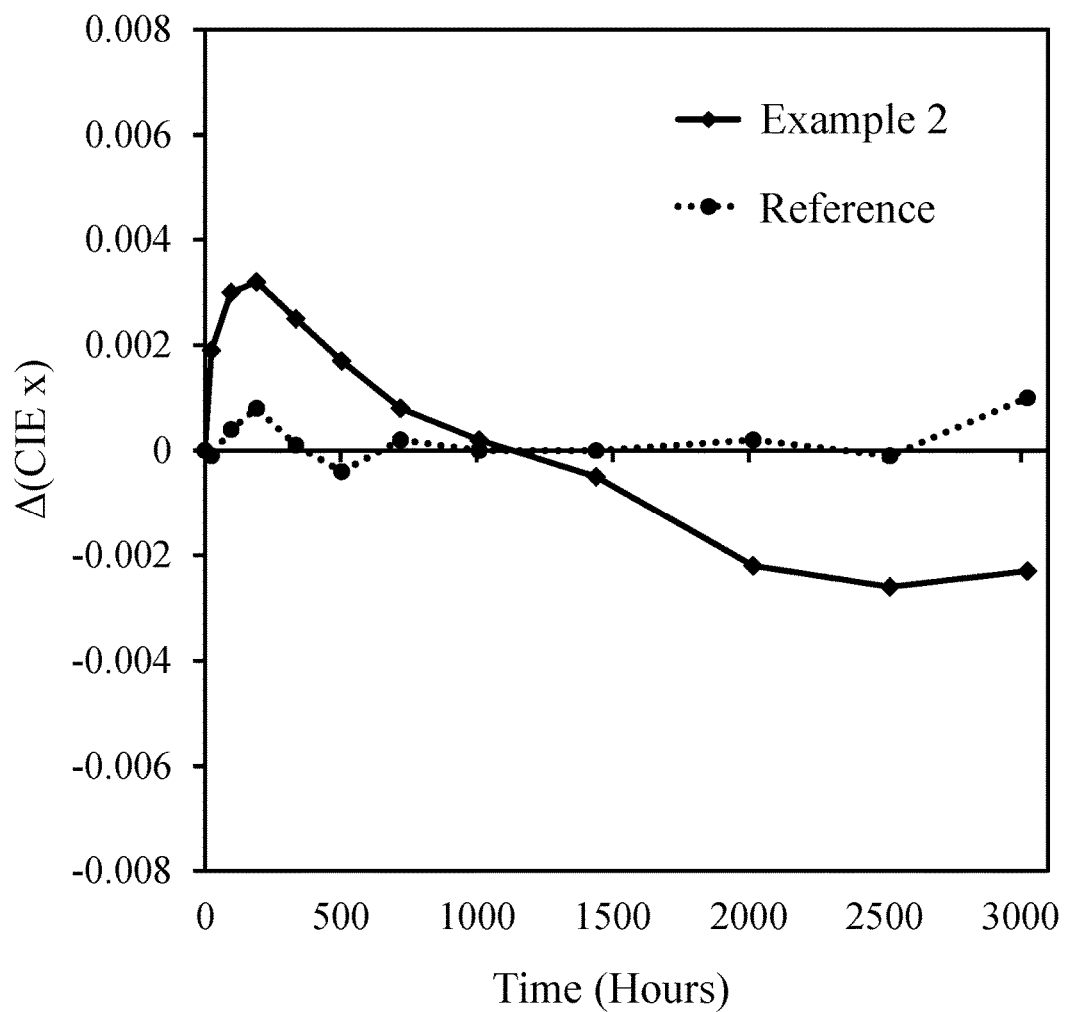
Figure 6C:
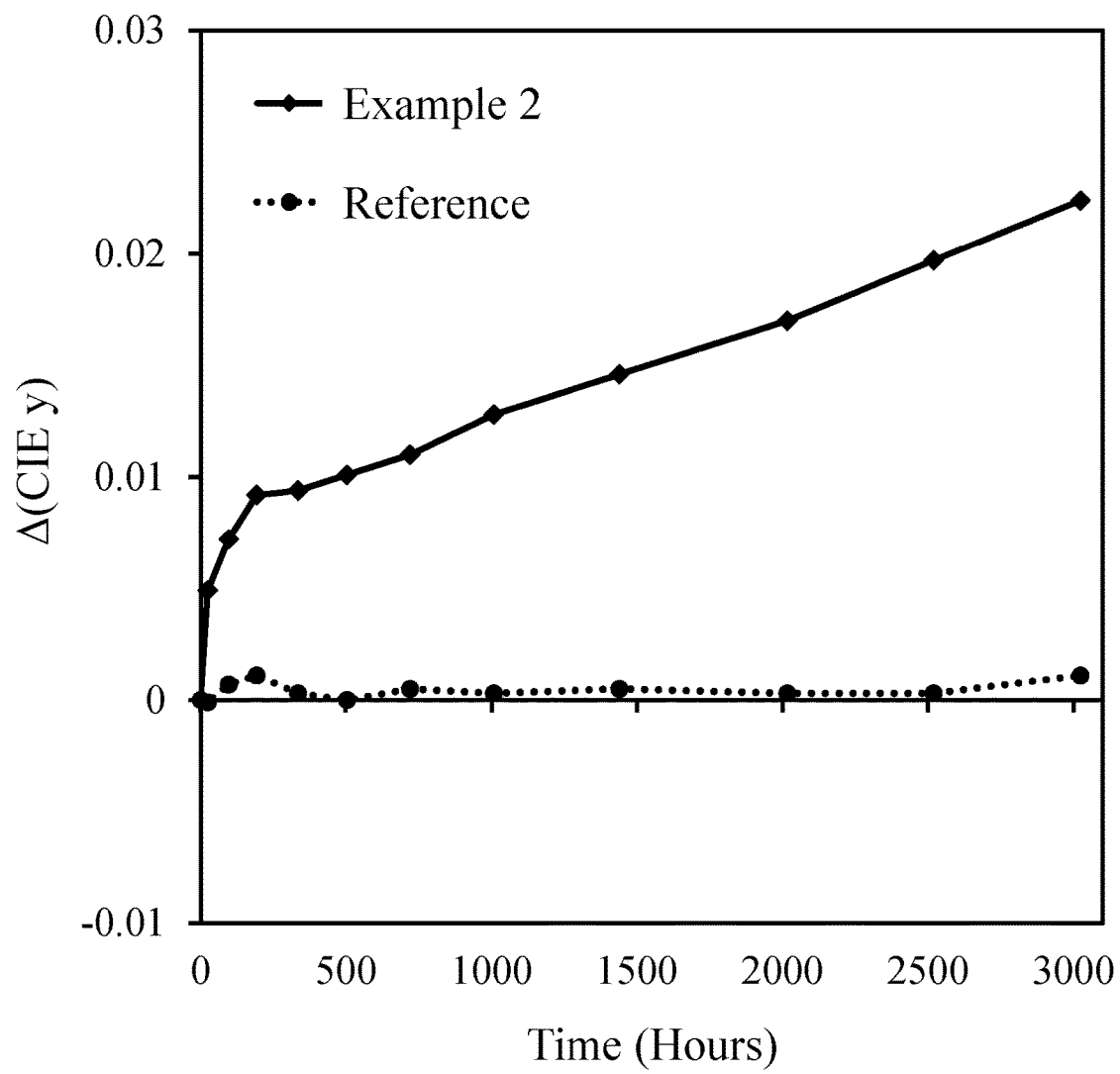

FIG. 6A to 6C are reliability data for wavelength conversion component Example 2 under accelerated testing conditions 85° C./85% RH (solid line) and under room temperature conditions (dashed line). The figures respectively show: 6A relative conversion efficacy (conversion efficacy relative to conversion efficacy at time t=0) versus time, 6B relative change of chromaticity Δ(CIE x) (change in CIE x relative to CIE x at time t=0) versus time and 6C relative change of chromaticity Δ(CIE y) (change in CIE y relative to CIE y at time t=0) versus time. All measured reliability data are for an excitation light irradiance of 110 mW·cm$^{-2}$.

Figure 7:
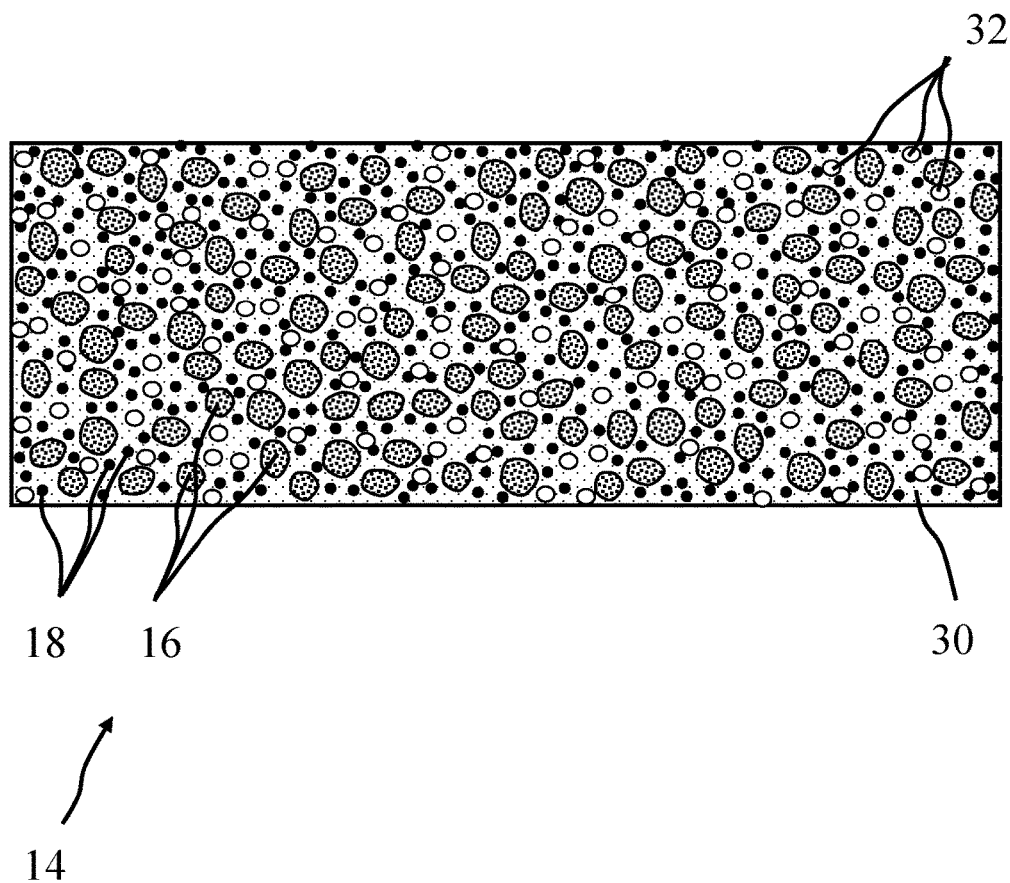
FIG. 7 is a schematic representation of a light transmissive white light photoluminescence wavelength conversion component in accordance with an embodiment of the invention which additionally includes light scattering particles.

FIG. 7 illustrates a light transmissive photoluminescence wavelength conversion component 14 in accordance with an embodiment of the invention that additionally includes light scattering particles 32. The inclusion of light scattering particles is found to increase photoluminescence light generation thereby enabling a reduction in the quantity of YAG-type phosphor 16 required to generate a given color of emitted light. It is believed that the increase in photoluminescence light generation results from the light scattering material increasing the probability of collisions of the photons with particles of the phosphor material. In some embodiments, the inclusion of the light scattering material can potentially, for a given emission product color and intensity, reduce phosphor material usage by 33% or more. Additionally, the inclusion of light scattering particles can improve color uniformity of emitted light and Color Over Angle (COA) of the emitted light by reducing any variation in light color with angle.

Examples of light scattering materials include particles of Zinc Oxide (ZnO), titanium dioxide (TiO$_2$), barium sulfate (BaSO$_4$), magnesium oxide (MgO), silicon dioxide (SiO$_2$) or aluminum oxide (Al$_2$O$_3$). In some embodiments the light scattering material comprises a white ink such as for example Norcote International Inc's super white ink GN-027SA which already includes particles of a highly light reflective material, typically TiO$_2$.

In some embodiments, the light scattering material utilized within the wavelength conversion component has a particle size that is selected such that the scattering particles will scatter blue excitation light relatively more than they will scatter light generated by the photoluminescence materials. For example, the light scattering particle size may be selected such that the particles will scatter blue excitation light relatively at least twice as much as they will scatter light generated by the at least one phosphor material. This ensures that a higher proportion of the blue excitation light will be scattered, increasing the probability of the photon interacting with a phosphor material particle and resulting in the generation of photoluminescence light. At the same time photoluminescence generated light can pass through with a lower probability of being scattered.

Since this approach can further increase the probability of blue photons interacting with a phosphor material particle, less phosphor material is required to generate a selected emission color. This arrangement can also increase luminous efficacy of the wavelength conversion component/device. In some embodiments the light scattering material comprises particles with an average particle size of less than about 150 nm and typically has an average particle size in a range 40 nm to 150 nm. Particles of such size will Mie scatter light differently depending on the light wavelength. The particle size of the light diffusive material can be selected to scatter excitation light more than photoluminescence generated light. Where the excitation light comprises blue light the particles of light diffusive material preferably have an average particle size of about 60 nm. In other embodiments, the light scattering material has an average particle size in a range 1 μm to 50 μm and more preferably in a range 10 μm to 20 μm.

Figure 8:
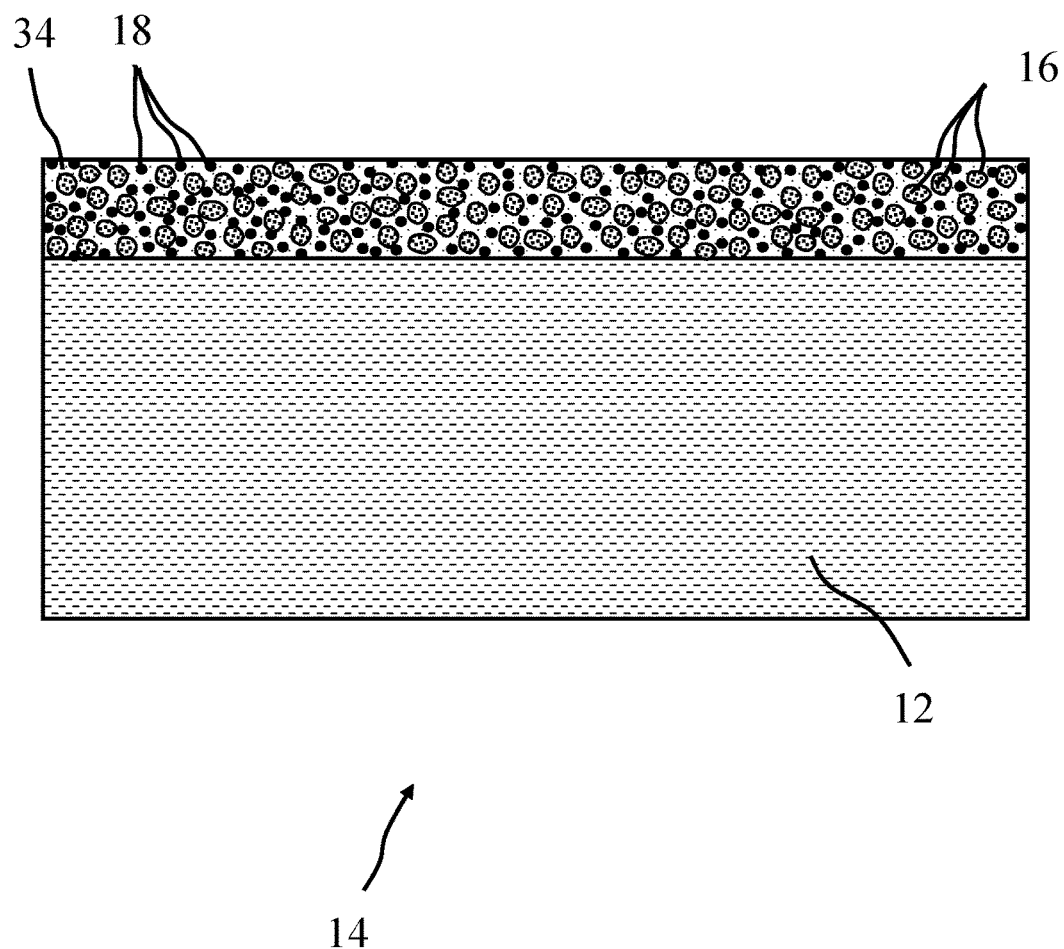
FIG. 8 is a schematic representation of a light transmissive white light photoluminescence wavelength conversion component in accordance with another embodiment of the invention.
Figure 9:
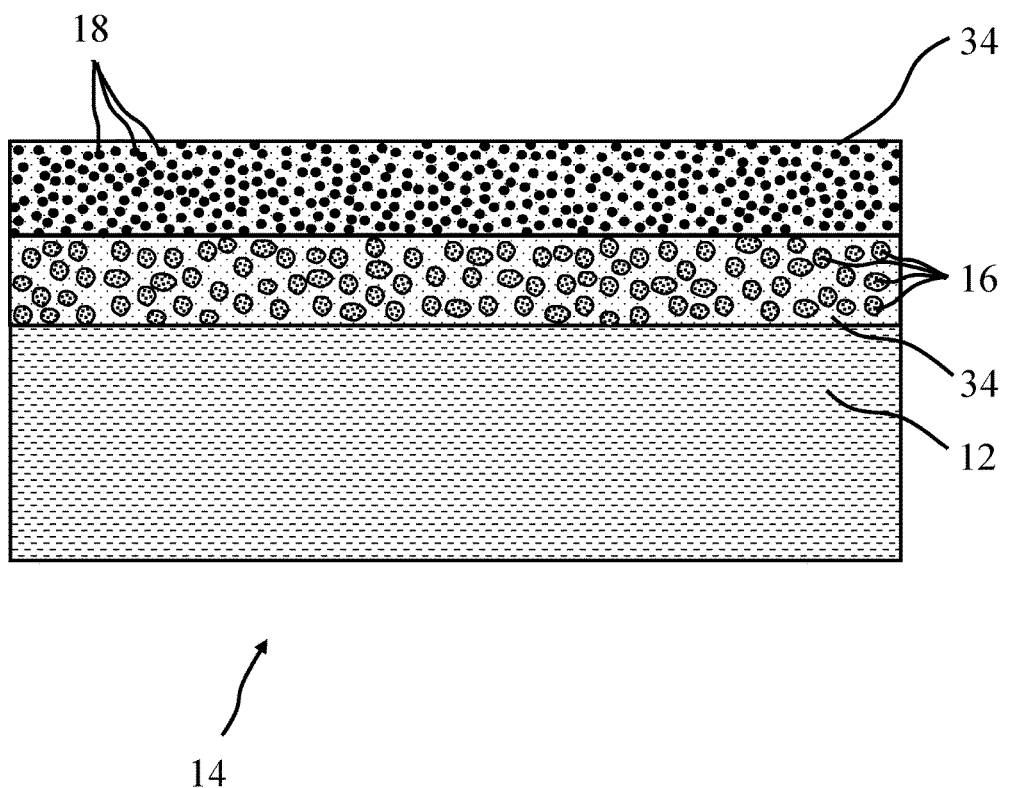
FIG. 9 is a schematic representation of a light transmissive white light photoluminescence wavelength conversion component in accordance with a further embodiment of the invention.

In other embodiments, and as shown in FIGS. 8 and 9, the YAG-type phosphor 16 and organic fluorescent dye 18 comprise at least one layer on the light transmissive substrate 30. The YAG-type phosphor 16 and organic fluorescent dye 18 which are both in powder form, are thoroughly mixed in known proportions with a light transmissive binder material 34 (for example a thermally or UV curable silicone) and the mixture then deposited as one or more substantially uniform thickness layers on the surface of the light transmissive substrate 30. The YAG-type phosphor 16 and organic fluorescent dye 18 can be incorporated together in a single layer as shown in FIG. 8 or comprise respective separate layers as illustrated in FIG. 9. Typically, the light transmissive binder 34 comprises a curable liquid polymer such as a polymer resin, a monomer resin, an acrylic, an epoxy, a silicone or a fluorinated polymer. Alternatively, the YAG-type phosphor and organic fluorescent dye can be combined with a clear ink such as for example Nazdar's® UV curable litho clear overprint PSLC-294 to form a "phosphor ink". In one embodiment the phosphor ink is deposited on the light transmissive substrate 30 by screen printing with the thickness t of the one or more layers be controlled by the number of printing passes. As will be apparent to those skilled in the art the YAG-type phosphor/organic fluorescent dye/binder mixture can be applied using other methods including inkjet printing, spin coating, slot die coating, roller coating, drawdown coating or sweeping the mixture over the surface using a blade such as a squeegee (e.g. doctor blading). The light transmissive substrate 30 preferably comprises a polycarbonate, acrylic, a glass or a silicone.

Light Reflective Photoluminescence Wavelength Conversion Components

Figure 10:
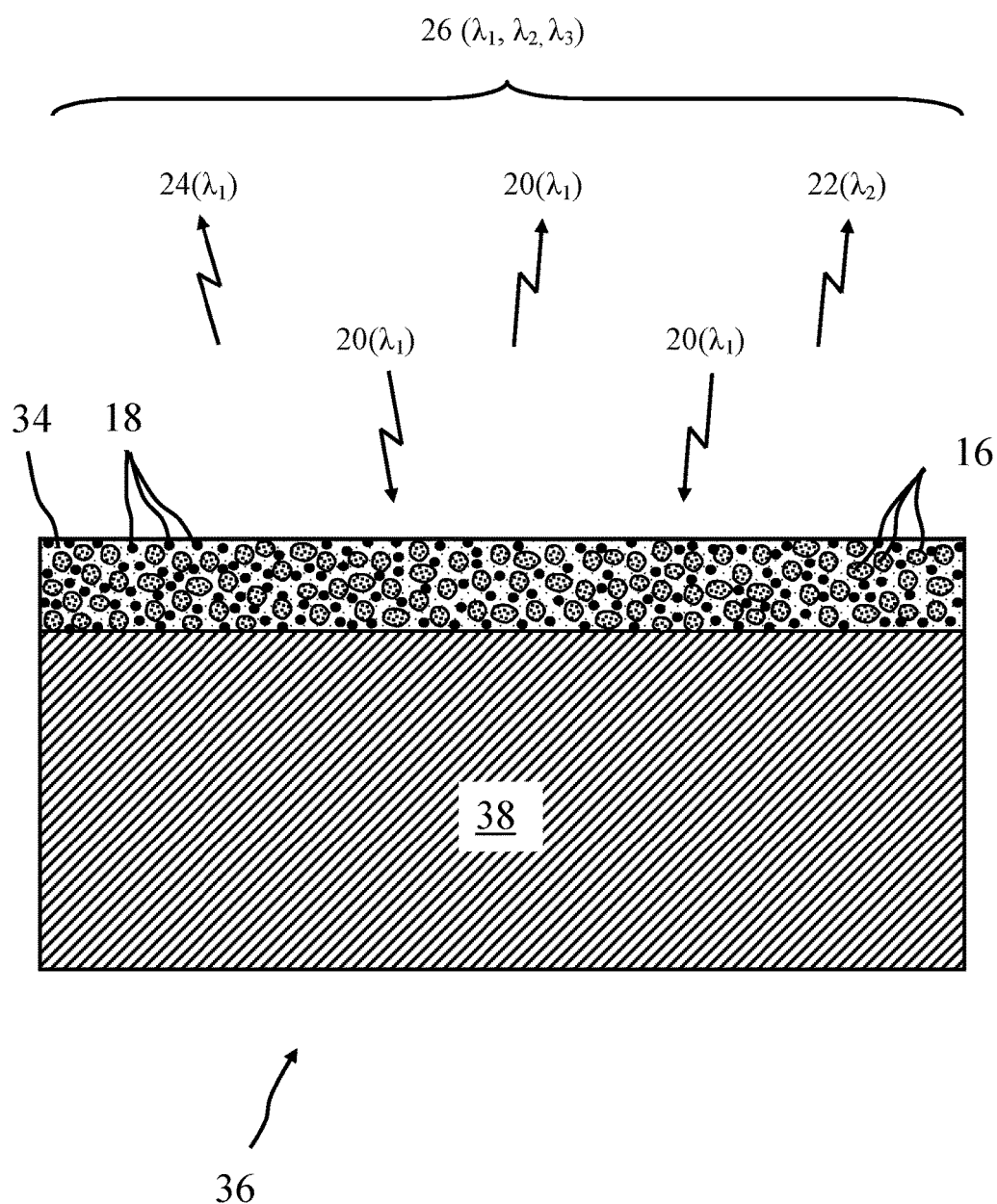
FIG. 10 is a schematic representation of a light reflective white light photoluminescence wavelength conversion component in accordance with an embodiment of the invention.

In other embodiments the wavelength conversion component can be light reflective. A light reflective wavelength conversion component 36 in accordance with an embodiment of the invention is shown in FIG. 10. For a light reflective wavelength conversion component 36 the YAG-type phosphor 16 and organic fluorescent dye 18 comprise one or more layers on a light reflective surface of the substrate 38. The YAG-type phosphor 16 and organic fluorescent dye 18 are incorporated in a light transmissive binder 34 and the mixture then deposited as one or more layers on the surface of the light reflective substrate. Similar to the embodiments of FIGS. 8 and 9, the YAG-type phosphor 16 and organic fluorescent dye 18 can be incorporated together in a single layer as shown in FIG. 7 or in respective separate layers. Typically, the light transmissive binder 34 comprises a curable liquid polymer such as a polymer resin, a monomer resin, an acrylic, an epoxy, a silicone or a fluorinated polymer. The one or more layers containing the YAG-type phosphor 16 and organic fluorescent dye 18 can be deposited as a substantially uniform thickness layer on the light reflective substrate 38 by screen printing, slot die coating, spin coating, roller coating, drawdown coating or doctor blading. The light reflective substrate can comprise any material having a high light reflectivity surface, typically a reflectance of 0.9 or higher, such as a highly reflective paper, a high reflectance polymer material such as a polycarbonate, acrylic, or metallic material such as silver, aluminum, chromium. To assist in the dissipation of heat the light reflective surface can be thermally conductive.

What is claimed is:

1. A white light photoluminescence wavelength conversion component comprising:
   at least one blue light excitable green to yellow light emitting yttrium aluminum garnet type phosphor which, when excited, emits green to yellow light having a peak wavelength in a range 510 nm to 570 nm and
   at least one blue light excitable orange to red light emitting organic fluorescent dye which, when excited, emits orange to red light having a peak wavelength in a range 585 nm to 670 nm;
   wherein organic fluorescent dye comprises less than 0.01% by weight of total photoluminescence material formed from a mixture of the at least one blue light excitable orange to red light emitting organic fluorescent dye and the at least one blue light excitable green to yellow light emitting yttrium aluminum garnet type phosphor.

2. The white light photoluminescence wavelength conversion component of claim 1, wherein the at least one yttrium aluminum garnet type phosphor, when excited, emits green light having a peak wavelength in a range 525 nm to 542 nm.

3. The white light photoluminescence wavelength conversion component of claim 1, wherein the at least one yttrium aluminum garnet type phosphor, when excited, emits yellow light having a peak wavelength in a range 545 nm to 570 nm.

4. The white light photoluminescence wavelength conversion component of any claim 1, wherein the orange to red organic fluorescent dye, when excited, emits orange light having a peak wavelength in a range 585 nm to 610 nm.

5. The white light photoluminescence wavelength conversion component of claim 1, wherein the orange to red organic fluorescent dye, when excited, emits red light having a peak wavelength in a range 615 nm to 670 nm.

6. The white light photoluminescence wavelength conversion component of claim 1, wherein the green to yellow yttrium aluminum garnet type phosphor and the orange to red light emitting organic fluorescent dye are incorporated in, and distributed throughout, a light transmissive substrate.

7. The white light photoluminescence wavelength conversion component of claim 1, wherein the green to yellow yttrium aluminum garnet type phosphor and orange to red light emitting organic fluorescent dye comprise at least one layer on a light transmissive substrate.

8. The white light photoluminescence wavelength conversion component of claim 7, wherein the green to yellow yttrium aluminum garnet type phosphor and red to orange light emitting organic fluorescent dye are incorporated in a light transmissive binder and comprise a respective separate layers.

9. The white light photoluminescence wavelength conversion component of claim 1, wherein the green to yellow yttrium aluminum garnet type phosphor material and orange to red light emitting organic fluorescent dye comprise at least one layer on a light reflective substrate.

10. The white light photoluminescence wavelength conversion component of claim 9, wherein the green to yellow yttrium aluminum garnet type phosphor and red to orange light emitting organic fluorescent dye are incorporated in a light transmissive binder and comprise a respective separate layers.

11. The white light photoluminescence wavelength conversion component of claim 1, and further comprising particles of a light scattering material.

12. The white light photoluminescence wavelength conversion component of claim 11, wherein the light scattering material is selected from the group consisting of:
   magnesium oxide, titanium dioxide, barium sulfate and combinations thereof.

13. The white light photoluminescence wavelength conversion component of claim 11, wherein the light scattering material has a particle size in a range selected from the group consisting of: 0.01 µm to 10 µm; 0.01 µm to 1 µm and 0.1 µm to 1 µm.

14. The white light photoluminescence wavelength conversion component of claim 11, wherein the light scattering material comprises particles of a size such that the particles scatter blue light relatively more than light generated by the at least one green to yellow yttrium aluminum garnet type phosphor.

15. The white light photoluminescence wavelength conversion component of claim 14, wherein the light scattering material has a particle size in a range 100 nm to 150 nm.

16. The white light photoluminescence wavelength conversion component of claim 1, wherein the component, when excited by blue light, generates white light having a color rendering index of at least 80.

17. A white light emitting device comprising: a solid-state light emitter operable to generate blue light having a peak wavelength in a range 430 nm to 490 nm and a white light photoluminescence wavelength conversion component according to claim 1.

18. The white light photoluminescence wavelength conversion component of claim 1, wherein the at least one yttrium aluminum garnet type phosphor has a general composition $(Y, M)_3(Al, M')_5(O, M'')_{12}:Ce^{3+}$ in which
   M is at least one of Tb, Gd, Sm, Lu, La, Sr, Ba, Ca and Mg;
   M' is at least one of Si, Ge, B, P and Ga; and
   M'' is at least one of F, Cl, N and S and wherein there is partial substitution of one or more of the Y, Al or O by elements M, M' and M'' respectively.

19. The white light photoluminescence wavelength conversion component of claim 1, wherein the orange to red organic fluorescent dye comprises a perylene based dye or a rhodamine based dye.

20. The white light photoluminescence wavelength conversion component of claim 1, wherein the organic fluorescent dye comprises approximately 0.005% by weight of the total photoluminescence material.

21. The white light photoluminescence wavelength conversion component of claim 1, wherein the organic fluorescent dye comprises approximately 0.00002% by weight of the total photoluminescence material.

22. A white light photoluminescence wavelength conversion component comprising:
   a polycarbonate light transmissive substrate;
   at least one blue light excitable green to yellow yttrium aluminum garnet type phosphor, which when excited, emits green to yellow light having a peak wavelength in a range 510 nm to 570 nm; and at least one blue light excitable orange to red light emitting organic fluorescent dye, which when excited, emits orange to red light having a peak wavelength in a range 585 nm to 670 nm;

wherein the green to yellow yttrium aluminum garnet type phosphor and the orange to red light emitting organic fluorescent dye are incorporated in, and distributed throughout, the light transmissive polycarbonate substrate; and wherein organic fluorescent dye comprises less than 0.01% by weight of total photoluminescence material formed from a mixture of the organic fluorescent dye and one or more phosphor materials.

* * * * *